United States Patent Office 3,644,407
Patented Feb. 22, 1972

3,644,407
PROCESS FOR THE PREPARATION OF STEROIDAL COMPOUNDS BY CYCLIZATION OF A AND B RINGS
Michael Rosenberger, Bloomfield, and Gabriel Saucy, Essex Fells, N.J., assignors to Hoffmann-La Roche Inc., Nutley, N.J.
No Drawing. Filed Jan. 19, 1970, Ser. No. 4,135
Int. Cl. C07c 173/00
U.S. Cl. 260—239.55 C                    7 Claims

ABSTRACT OF THE DISCLOSURE

Tetracyclic steroidal molecules may be prepared by simultaneous cyclization of the A and B ring. The substrate for this cyclization process is a bicyclic polyketone. The reaction is conducted in the presence of an acid or preferably an acid-base complex system. In a specific embodiment 4-(3,7-dioxo-octyl) - 1a - methylperhydroindan-1,5-dione is converted into 19-nor-androsta-4,9(10)-dien-3,17-dione in the presence of piperidine acetate. The steroidal compounds prepared by the process described herein are useful intermediates in the preparation of steroids having valuable pharmacological activity.

BRIEF DESCRIPTION OF THE INVENTION

The present invention relates to a process for the preparation of tetracyclic steroid molecules. In particular, the process of the present invention relates to the cyclization of polyketonic bicyclic compounds of the following formula

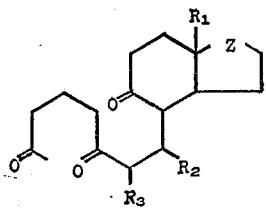

I where Z is a member selected from the group consisting of carbonyl and a group of the formula

where $R_4$ taken alone is hydroxy, lower alkoxy and lower alkanoyloxy, $R_5$ taken alone is hydrogen and lower aliphatic hydrocarbyl and $R_4$ and $R_5$ taken together are lower alkylenedioxy; $R_1$ is lower alkyl; and $R_2$ and $R_3$ are hydrogen or lower alkyl to yield steroidal molecules of the following formula

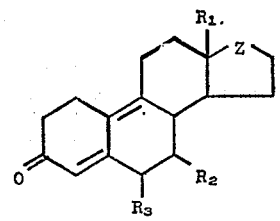

II where Z, $R_1$, $R_2$ and $R_3$ are as above.

In preferred embodiments compounds of Formula I and II are defined wherein Z is carbonyl, $R_1$ is methyl or ethyl, $R_2$ and $R_3$ are both hydrogen. Particularly preferred compounds are obtained when the absolute configuration of $R_1$ at 7a is beta and the hydrogen at 3a is alpha in compounds of formula (corresponding to 13β and 14α respectively in compounds of Formula II).

As used herein the term "lower alkyl" is meant to include straight or branched chain hydrocarbon radicals having from 1 to 7, most preferably from 1 to 4 carbon atoms. Examples of suitable lower alkoxy groups include for example methoxy, ethoxy, propoxy and the like. The term "lower alkanoyloxy" includes groups such as acetyloxy, propionyloxy, butanoyloxy and the like. As used herein the term "lower aliphatic hydrocarbyl" is meant to denote a monovalent substituent having from 1 to 7 carbon atoms consisting solely of carbon and hydrogen and which contains no aromatic unsaturation but which can be otherwise saturated or unsaturated, i.e., an alkyl or alkylene group. The term "lower acyl" denotes a group consisting of the residue of a hydrocarbyl monocarboxylic acid formed by removal of the hydroxyl portions of the carboxyl group and which contains up to 8 carbons.

A critical feature of the present invention resides in the use of an acid or an acid-base complex system in the aforesaid process. This acid or acid-base complex system serves to catalyze the indicated reaction to effectuate closure of the A and B rings of the steroidal molecule.

The acids useful in the practice of the present invention in the embodiment wherein they are the sole catalytic component can comprise either strong inorganic or organic acids. Examples of suitable inorganic acids include the mineral acids, most preferably sulfuric acid, hydrochloric acid and hydrobromic acid.

Organic acids which can be employed as sole catalysts in the instant process include the sulfonic acids such as the aryl sulfonic acids, e.g., p-toluenesulfonic acid or the lower alkyl sulfonic acids, e.g., methyl sulfonic acid.

In a more preferred embodiment the process of the present invention is conducted in the presence of an acid-base complex system. The acid component of such a complex can comprise an inorganic or organic acid. Examples of suitable inorganic acids include perchloric acid and the mineral acids enumerated before. Among the organic acids one can include, for example, the carboxylic acids (both mono- and polycarboxylic acids) and the organic sulfonic acids. Preferred organic acids include monocarboxylic acids such as lower alkanoic carboxylic acids having from 2 to 10 carbon atoms, e.g., acetic acid, propionic acid, decanoic acid and the like or aromatic carboxylic acids such as benzoic acid. The aforesaid organic acids may also contain other substituent groups such as halogen or nitro. Thus, the halogenated lower alkanoic acids represent another preferred embodiment of this invention and include, as specific examples, α-chloroacetic acid and trifluoroacetic acid. The nitrobenzoic acids are an example of nitro substituted organic acids.

The base component of the acid-base complex system is preferably an organic nitrogen containing compound, most desirably, a cyclic nitrogen containing organic compound. The cyclic base compound may have 5 or 6 atoms in its ring structure and can contain an additional hetero atom such as oxygen. Suitable cyclic bases useful in the practice of this invention include pyrrolidine, piperidine, and morpholine.

Examples of preferred acid-base complex systems include pyrrolidine acetate, piperidine acetate, piperidine α-chloroacetic acid, morpholine acetate, piperidine perchlorate, piperidine p-toluenesulfonic acid, among others. A most preferred acid-base complex is piperidine acetate.

The cyclization process may be conveniently conducted at a temperature in the range of from about room temperature to 135° C., most preferably in the range of from about 100° to 125° C. The reaction may be conducted in the presence of an inert organic solvent. Suitable solvents for this purpose include aromatic hydrocarbons such as benzene, xylene or toluene; ketones such as acetone; and lower alkanols such as methanol, ethanol, i-propanol and the like.

It is most desirable to conduct the cyclization reaction in the absence of atmospheric oxygen. Thus, the reaction mixture is preferably covered with an inert gas such as nitrogen, argon, helium and the like, during the course of the reaction. The reaction product may be isolated from the reaction mixture using conventional techniques such as chromatography and/or fractional crystallization.

The starting polyketones of Formula I above may be readily prepared by oxidation of the compounds of the formula

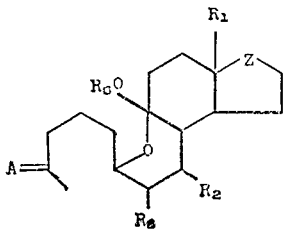

IV where Z, $R_1$, $R_2$ and $R_3$ are as above, A is oxo or

and $R_6$ is hydrogen, lower alkyl and lower acyl.

The oxidation of compounds of Formula IV above may be conveniently conducted with a chemical oxidizing agent such as chromium trioxide in the presence of a strong mineral acid, e.g., aqueous sulfuric acid or chromic acid in acetic acid. An inert organic solvent may also be present in the reaction mixture. Suitable organic solvents for this purpose include ketones such as acetone; ethers such as ethyl ether; aromatic hydrocarbons such as benzene, toluene, xylene; a chlorinated hydrocarbon such as 1,2-dichloroethane, methylene chloride, chlorobenzene and the like. The oxidation reaction may be conducted at a temperature in the range of from about $-10$ to $+80°$ C., most preferably at a temperature in the range of from about 0 to $30°$ C.

It is necessary that when compounds of Formula I where Z comprehends a hydroxy methylene moiety are prepared that the starting material of Formula IV above be selected having a corresponding lower alkanoyloxy methylene group. This is due to the fact that an unprotected hydroxy group such as when A is

will be converted to a carbonyl under the conditions used in the above oxidataion step. The hydroxy group may then be obtained from its protected form subsequent to the oxidation step by hydrolysis procedures well known in the art. Thus, compounds of Formula IV where Z is hydroxymethylene can be used as starting material for compounds of Formula 1 where Z is carbonyl since the former group will be converted to the latter under the conditions of the oxidation reaction.

The preparation of compounds of Formula IV is described in detail in co-pending application Ser. No. 633,-730, filed Apr. 26, 1967; inventor Gabriel Saucy, now abandoned.

It is within the scope of the present invention to utilize both racemic and optically active compounds in the practice of the processes enumerated above. Compounds of Formula II produced by the process of the present invention are steroidal compounds of known pharmacological utility or are useful as intermediates in the preparation of other steroidal molecules of known pharmacological utility.

The process of the present invention may be illustrated by reference to the following examples.

EXAMPLE 1

A solution of 5 g. of $(\pm)$-4-(3,7-dioxo-octyl)-7a-methylperhydroindan-1,5-dione in 100 ml. of toluene was heated at reflux under nitrogen with 1 g. of piperidine acetate for 18 hours. The reaction mixture was then treated with dichloromethane, extracted with aqueous sulfuric acid (2 N) and dried over magnesium sulfate. Removal of the solvents in vacuo gave 5.1 g. of an oil which was chromatographed on 450 g. of 0.2–0.5 mm. mesh silica gel. Elution with 25 percent and 50 percent ethyl acetate-benzene mixture yielded 2.2 g. of $(\pm)$-19-nor-androsta-4,9(10)-dien-3,17-dione. Crystallization from ether gave the aforesaid product melting at 106–108° C. Recrystallization from hexane/ethyl acetate raised the melting point to 107–109° C. This material has ultraviolet maxima (in ethanol) at 210, 237 and 300 m$\mu$. $\epsilon$=6200, 3000 and 20,500 respectively.

$C_{18}H_{22}O_2$; calcd. (percent): C, 79.96; H, 8.20. Found (percent): C, 79.96; H, 8.19.

The starting material may be prepared as follows:

A total of 49 g. of $(\pm)$-3-(4-oxopentyl)-6a$\beta$-methylperhydrocyclopenta(f)(1)benzopyran - 4a,7-diol was dissolved in 690 ml. of acetone and treated at 5–10° C. with a solution containing 46 g. of chromium trioxide dissolved in 231 ml. of 6 N sulfuric acid. After stirring at room temperature for 2 hours, aqueous sodium bisulfite solution (1500 ml.; 1 percent) was added and the organic products were isolated with benzene. The benzene extract was washed well with saturated aqueous sodium bicarbonate solution and brine and then concentrated in vacuo. The 34 g. of crude $(\pm)$ - 4-(3,7-dioxo-octyl)-7a-methylperhydroindan-1,5-dione obtained was chromatographed on silica gel (0.2–0.5 mm. mesh; 1.5 kg.) and upon elution with 10 percent ethanol-ether yielded 23 g. of pure product. This material solidified to a waxy mass on standing. This product exhibited strong carbonyl bands at 1740 cm.$^{-1}$ and 1717 cm.$^{-1}$ in the infrared.

$C_8H_{26}O_4$ Calcd. (percent): C, 70.56; H, 8.55. Found (percent): C, 69.90; H, 8.51.

EXAMPLE 2

A solution containing 1.0 g. of $(+)$ - 4-(3,7-dioxo-octyl) - 7a$\beta$-methyl-perhydroindan-1,5-dione in 25 ml. of toluene was heated at reflux under nitrogen with 0.20 g. of piperidine acetate for 16 hours. The toluene was removed in vacuo and the residue was taken up in dichloromethane, extracted with 1 N sulfuric acid, brine and then dried over sodium sulfate. Removal of the solvents in vacuo gave 890 mg. of an oil which was chromatographed on 89 g. of silica gel. Elution with 20 percent and 35 percent ethyl acetate in benzene yielded 324 mg. of nearly pure product $(-)$-19-nor-androsta-4,9(10)-dien-3, 17-dione. Crystallization from ether gave 225 mg. of product M.P. 138–140° C., $[\alpha]_D^{25}=-172.4°$ (c.=1.0 MeOH). Recrystallization from ethyl acetate-hexane gave pure product M.P. 142.5–143.5° C., $[\alpha]_D^{25}=-191.44$ (c.=0.4858 MeOH), $\lambda_{max}$=301 m$\mu$ ($\epsilon$=20,600 EtOH)

The starting material may be prepared as follows:

A mixture containing $(-)$-3$\alpha$-(4-hydroxypentyl)-6a$\beta$-methylperhydrocyclopenta[f][1]benzopyran - 4a,7$\beta$-diol, prepared by stirring 10 g. of crude $(-)$-3$\alpha$-(4-hydroxypentyl) - 6a$\beta$ - methyl - 1,2,3,5,6,6a,7,8,9,9a - decahydrocyclopenta[f][1]benzopyrans-7$\beta$-ol in 200 ml. of acetone and 25 ml. of 1 N sulfuric acid for two hours at room temperature, was cooled to 0° C. and treated with 37.5 ml. of Jones reagent over 15 minutes after stirring at room temperature for two hours, 300 ml. of 1 percent aqueous sodium bisulfite solution was added and the solution extracted with benzene. The benzene extracts were washed well with saturated bicarbonate solution, brine and then were concentrated in vacuo. There was obtained 8.4 g. of crude $(+)$ - 4-(3,7-dioxo-octyl)-7a$\beta$-methyl-perhydroindan-1,6-dione. This product was purified by chromatography on 420 g. of silica gel and elution with ether-benzene and ether alone. The IR spectrum of the purified material exhibited strong carbonyl absorption at 1740 cm.$^{-1}$ and 1717 cm.$^{-1}$.

What is claimed is:

1. A process for the preparation of steroidal compounds of the formula

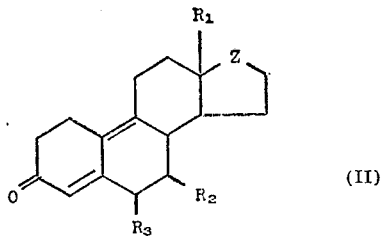

(II)

where Z is a member selected from the group consisting of carbonyl and a group of the formula

where $R_4$ taken alone is hydroxy, lower alkoxy, and lower alkanoyloxy, $R_5$ taken alone is hydrogen and lower aliphatic hydrocarbyl and $R_4$ and $R_5$ taken together are lower alkylenedioxy; $R_1$ is lower alkyl; and $R_2$ and $R_3$ are hydrogen or lower alkyl which process comprises cyclizing a compound of the formula

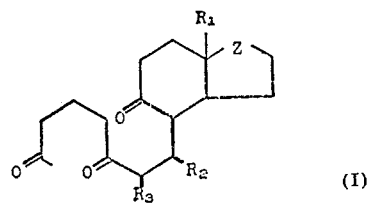

(I)

where Z, $R_1$, $R_2$ and $R_3$ are as above in the presence of a catalyst consisting of an acid-base complex system.

2. The process of claim 1 wherein said catalyst is an acid base complex system which consists essentially of an organic carboxylic acid and a cyclic nitrogen containing organic compound.

3. The process of claim 2 wherein said acid-base complex system consists of a lower alkanoic carboxylic acid having from 2 to 10 carbon atoms and a base selected from the group consisting of pyrrolidine, piperidine, morpholine, pyridine and pyrrole.

4. The process of claim 3 wherein said acid-base complex system is piperidine acetate.

5. The process of claim 1 wherein Z is carbonyl, $R_1$ is methyl and $R_2$ and $R_3$ are hydrogen.

6. The process of claim 5 wherein said compounds of Formulae I and II are in optically active form.

7. The process of claim 5 wherein said compounds of Formulae I and II are present as a racemic mixture.

References Cited

UNITED STATES PATENTS 3,318,922   5/1967   Windholz et al. ____ 260—397.4
3,519,714   7/1970   Hughes et al. _____ 424—238

HENRY A. FRENCH, Primary Examiner

U.S. Cl. X.R.

260—397.3, 397.4, 586 H